(12) United States Patent
Wu et al.

(10) Patent No.: US 10,191,405 B2
(45) Date of Patent: Jan. 29, 2019

(54) ELECTROSTATIC CHARGING MEMBER

(71) Applicant: Xerox Corporation, Norwalk, CT (US)

(72) Inventors: Jin Wu, Pittsford, NY (US); Lin Ma, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/349,023

(22) Filed: Nov. 11, 2016

(65) Prior Publication Data
US 2018/0136578 A1 May 17, 2018

(51) Int. Cl.
G03G 15/02 (2006.01)
C09D 161/28 (2006.01)

(52) U.S. Cl.
CPC ....... G03G 15/0233 (2013.01); C09D 161/28 (2013.01)

(58) Field of Classification Search
CPC ............. G03G 9/0804; G03G 9/09708; G03G 9/08782; G03G 9/0819; G03G 9/08795; G03G 9/08797; G03G 9/0827; G03G 9/09725; G03G 9/09392; G03G 15/0233; G03G 9/0825; G03G 9/1131; G03G 9/1136; G03G 9/0821
See application file for complete search history.

(56) References Cited

U.S. PATENT DOCUMENTS

| | | | |
|---|---|---|---|
| 6,141,516 A * | 10/2000 | Law | G03G 15/0233 399/176 |
| 7,148,309 B2 | 12/2006 | Malik et al. | |
| 8,090,298 B2 | 1/2012 | Hoshio et al. | |
| 2003/0059618 A1 * | 3/2003 | Takai | C07D 303/16 428/413 |
| 2009/0274487 A1 * | 11/2009 | Nakamura | G03G 15/0233 399/176 |
| 2011/0052252 A1 | 3/2011 | Lin et al. | |
| 2011/0212390 A1 * | 9/2011 | Masunaga | G03F 7/0046 430/5 |
| 2012/0107559 A1 | 5/2012 | Ferrar et al. | |
| 2012/0171494 A1 | 7/2012 | Ferrar et al. | |
| 2012/0301818 A1 * | 11/2012 | Gilmartin | G03G 15/0233 430/66 |
| 2014/0127616 A1 | 5/2014 | Wu | |
| 2015/0331342 A1 * | 11/2015 | Yamaguchi | G03G 5/043 492/18 |
| 2016/0306288 A1 | 10/2016 | Wu et al. | |

FOREIGN PATENT DOCUMENTS

| | | |
|---|---|---|
| EP | 1726627 A2 | 11/2006 |
| EP | 1726628 A1 | 11/2006 |

OTHER PUBLICATIONS

Crystallization behaviour of polyoxetanes: poly(oxetane), poly(3,3-dimethyloxetane) and poly(3,3-diethyloxetane), E. Perez, M. A. Gomez, A. Bello, and J. G. Fatou, 1983, Colloid & Polymer Sci. 261,571-576.*
European Search Report for EP Application No. 17200628.0-1022, dated Feb. 8, 2018, 9 pages.

* cited by examiner

Primary Examiner — Roy Y Yi
(74) Attorney, Agent, or Firm — Hoffman Warnick LLC

(57) ABSTRACT

The present teachings describe a bias charging member. The charging member includes a conductive core and an outer surface layer disposed on the conductive core. The outer surface layer includes a crosslinked hydroxyl terminated poly(oxetane) based fluorinated polyether and an aminoplast resin.

18 Claims, 1 Drawing Sheet

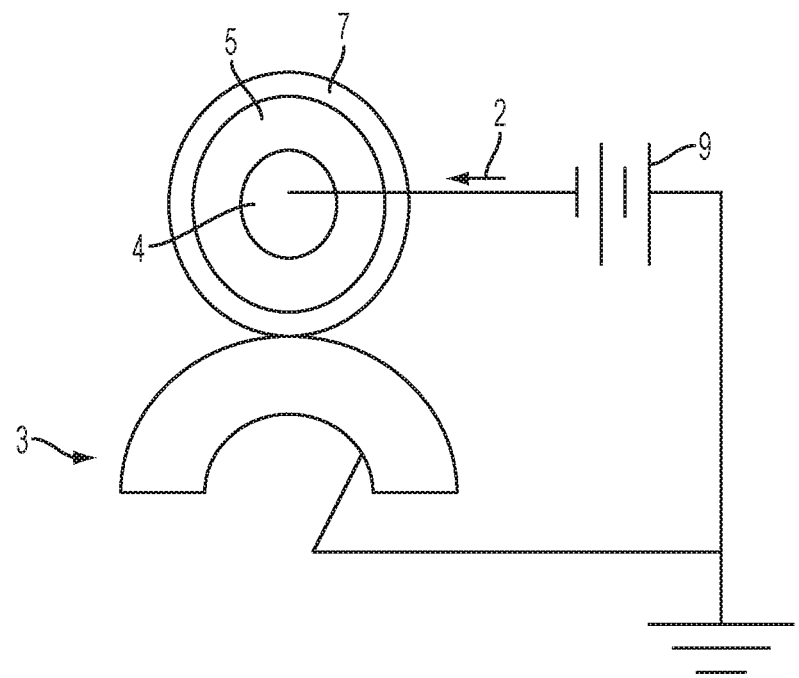

ELECTROSTATIC CHARGING MEMBER

BACKGROUND

Field of Use

The present invention relates to an electrostatic charging member, and more specifically, to an outer surface layer of an electrostatic charging member.

Background

Image forming apparatuses require electrostatic charging of an image holding member by use of an electrostatic charging member or bias charging member. Electrostatic latent images differing from their surroundings in electric potential are formed on the electrostatically charged image holding member. The electrostatic latent images are developed with a developer containing toner, and eventually transferred to a recording material.

Electrostatic charging members are devices having the function of charging electrostatically image holding members and can use contact charging method, wherein the charging member is brought into direct contact with the image holding member to perform electrostatically charge of the image holding members.

The electrostatic charging member is equipped with an electrostatic charging member, such as an electrostatic charging roll, which is brought into direct contact with the surface of an image holding member and made to rotate in synchronization with movement of the image holding member's surface, thereby giving electrostatic charges to the image holding member. The electrostatic charging roll is made up of, e.g., a base material and an elastic conducting layer formed around the peripheral surface of the base material and an outer most layer.

Presently, the outermost layer is coated onto the elastic conducting layer and thermally cured using fluorine containing components that can cause environmental problems.

It would be desirable to provide an outermost layer that does not require the use of compounds that are a danger to the environment.

SUMMARY

According to an embodiment, there is provided a charging member. The charging member includes a conductive core and an outer surface layer disposed on the conductive core. The outer surface layer includes a crosslinked hydroxyl terminated poly(oxetane) based fluorinated polyether and an aminoplast resin.

According to an embodiment, there is provided a charging member. The charging member includes a conductive core, a base material disposed on the conductive core; and an outer surface layer disposed on the base material. The outer surface layer includes a crosslinked hydroxyl terminated poly(oxetane) based fluorinated polyether and an aminoplast resin.

According to another embodiment there is provided a bias charging member including a conductive core, a base material disposed on the conductive core and an outer surface layer disposed on the base material. The outer surface layer includes a hydroxyl terminated poly(oxetane) based fluorinated polyether and an aminoplast resin. The hydroxyl terminated poly(oxetane) based fluorinated polyether is from about 1 weight percent to about 75 weight percent of the outer surface layer. The aminoplast resin is from about 25 weight percent to about 99 weight percent of the outer surface layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 1 demonstrates an illustrative bias charging roll (BCR) having an electrically conductive core and an outer surface layer provided thereon.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Fluorine containing agents possess certain properties that make them useful as components for various devices. Fluorine containing agents typically provide low surface energy to coating and surface layers. However, it is known that most fluorine containing compounds are not environmentally friendly since they tend to bioaccumulate. Perfluorooctane sulfonate (PFOS) and perfluorooctanoic acid (PFOA) are perfluorinated surfactants used to produce polymers and telomers whose carbon chains can be of varying length. Polytetrafluoroethylene (PTFE), namely TEFLON®, is the chief fluoropolymer and it has been widely utilized over the last decades all over the world. Indeed, its particular physical and chemical properties make it difficult to replace this substance in several industries (textile, paper, chemical, fire-fighting foam industry). Perfluoroalkyl compounds may be considered ubiquitous and, in particular, it has been shown that PFOS may be concentrated in the food chain. Concerns about possible toxic effects of these chemicals date back to seventies, but only in 2000 did the Environmental Protection Agency (EPA) state that PFOA and PFOS should be withdrawn to avoid environmental pollution. In 2002, the Organization for Economic Co-operation and Development reported that these substances are bio-persistent, tend to accumulate in different tissues of living organisms and are toxic to mammalians. In 2006, the EPA established that every PFOA emission be eliminated by 2015.

Disclosed herein is an outer surface layer or protective overcoat layer for use in a bias charging roll. The outer surface contains a crosslinked hydroxyl terminated poly (oxetane) based fluorinated polyether and an aminoplast resin. Unlike other commonly used fluorine containing compound such as main-chain perfluoroalkyl compounds/resins, or TEFLON®-like materials including fluorinated ethylene propylene copolymer (FEP), polytetrafluoroethylene (PTFE), polyfluoroalkoxy polytetrafluoroethylene (PFA TEFLON®) and other TEFLON®-like materials, the disclosed hydroxyl terminated poly(oxetane) based fluorinated polyether does not bioaccumulate.

Referring to FIG. 1, there is shown an embodiment having a bias charging roller (BCR) 2 held in contact with an image carrier implemented as a photoconductive member 3. However, embodiments herein can be used for charging a dielectric receiver or other suitable member to be charged. The photoconductive member 3 may be a drum, a belt, a film, a drelt (a cross between a belt and a drum) or other known photoconductive member. While the BCR 2 is in rotation, a DC voltage and optional AC current is applied from a power source 9 to an electro-conductive core 4 of the BCR 2 to cause it to charge the photosensitive member 3. Shown in FIG. 1, the electro-conductive core 4 is surrounded by a base material 5. Although shown as one layer, it is possible to eliminate the base material 5 or have multiple layers of base material 5. These layers are referred to as base layers, intermediate layers or substrate layers. The base material 5 for the BCR 2 can be any elastic material with semiconductive dopant of suitable fillers discussed below. A conductive protective overcoat is provided on the base material 5 of the BCR 2 to form the outer surface layer 7. There may or may not be a filler in the substrate layer, intermediate layer, and outer layer.

The electro-conductive core 4 serves as an electrode and a supporting member of the charging roll, and is composed of an electro-conductive material such as a metal or alloy of aluminum, copper alloy, stainless steel or the like; iron coated with chromium or nickel plating; an electro-conductive resin and the like. The diameter of the electro-conductive core is, for example, about 1 mm to about 20 cm, or from about 5 mm to about 2 cm.

The base material 5 can be isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber (EPDM), acrylonitrile-butadiene copolymer rubber (NBR), natural rubber, and blends thereof. Among these, polyurethane, silicone rubber, EPDM, epichlorohydrin-ethylene oxide copolymer rubber, epichlorohydrin-ethylene oxide-allyl glycidyl ether copolymer rubber, NBR, and blends thereof are preferably used.

An electro-conductive agent, an electronic electro-conductive agent or an ionic electro-conductive agent may be used in the base materials. Examples of the electronic electro-conductive agent include fine powder of: carbon black such as Ketjen Black and acetylene black; pyrolytic carbon, graphite; various kinds of electro-conductive metal or metal alloy such as aluminum, copper, nickel and stainless steel; various kinds of electro-conductive metal oxide such as tin oxide, indium oxide, titanium oxide, tin oxide-antimony oxide solid solution, and tin oxide-indium oxide solid solution; insulating materials having a surface treated by an electro-conductive process; and the like. Furthermore, examples of the ionic electro-conductive agent include perchlorates or chlorates of tetraethylammonium, lauryltrimethyl ammonium and the like; perchlorates or chlorates of alkali metal such as lithium and magnesium, and alkali earth metal; and the like. These electro-conductive agents may be used alone, or in combination of two or more kinds thereof.

Furthermore, the amount of addition to the base materials is not particularly limited. For example, the amount of electro-conductive agent to be added is from about 1 to about 30 parts by weight, or from about 5 to about 25 parts by weight with respect to 100 parts by weight of the rubber material. The amount of the ionic electro-conductive agent to be added is in the range of about 0.1 to about 5.0 parts by weight, or from about 0.5 to about 3.0 parts by weight with respect to 100 parts by weight of the rubber material. The layer thickness of the base material is from about 1 mm to about 20 cm, or from about 5 mm to about 3 cm.

The outer surface layer or protective overcoat layer 7 includes a hydroxyl terminated poly(oxetane) based fluorinated polyether and an aminoplast resin.

In addition, poly(oxetane) based fluorinated polyether diols are readily soluble in alcohol solvents, which makes both the coating process and the coating itself more environmentally friendly.

The overcoat layer 7 further includes a surface roughness control agent, an optional wetting agent, a conductive component, and an acid catalyst.

The hydroxyl terminated poly(oxetane) based fluorinated polyether and aminoplast resin are coated from a solution or a dispersion and cured. The thickness of the outer surface layer is from about 0.1 µm to about 500 µm, or from about 1 µm to about 50 µm.

The poly(oxetane) based fluorinated polyethers are available from OMNOVA Solutions. Compared to certain telomer-based and other conventional fluorine containing compounds such as PFA, PTFE etc., the poly(oxetane) based fluorinated polyethers have been found not to bioaccumulate, resulting in very low environmental impact.

In addition, the disclosed environmentally friendly poly(oxetane) based fluorinated polyethers are soluble or dispersible in a variety of common organic solvents including ketones, alcohols and esters, which makes it very different from other fluorochemicals.

One embodiment of a poly(oxetane) based fluorinated polyether is POLYFOX™ PF-7002, which structure is shown as below:

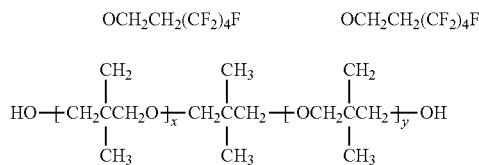

wherein x is from about 1 to about 40, or from about 2 to about 20, or from about 5 to about 15; and y is from about 1 to about 40, or from about 2 to about 20, or from about 5 to about 15; and the sum of x and y is from about 2 to about 80, or from about 2 to about 60, or from about 6 to about 20.

An embodiment of a poly(oxetane) based fluorinated polyether that can be used in the outer layer of the bias charge member includes:

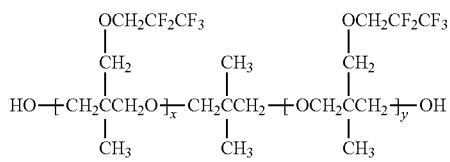

wherein x is from about 1 to about 40, or from about 2 to about 20, or from about 5 to about 15; and y is from about 1 to about 40, or from about 2 to about 20, or from about 5 to about 15; and the sum of x and y is from about 2 to about 80, or from about 2 to about 60, or from about 6 to about 20.

Another embodiment of a poly(oxetane) based fluorinated polyether that can be used in the outer layer of the bias charge member includes:

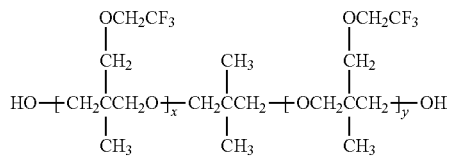

wherein x is from about 1 to about 40, or from about 2 to about 20, or from about 5 to about 15; and y is from about 1 to about 40, or from about 2 to about 20, or from about 5 to about 15; and the sum of x and y is from about 2 to about 80, or from about 2 to about 60, or from about 6 to about 20.

The fluorine or fluoride (F) content of the hydroxyl terminated poly(oxetane) based fluorinated polyethers as determined by known methods, such as IR spectroscopy, are, for example, from about 10 to about 70 weight percent, from about 20 to about 50 weight percent, and from about 45 to about 50 weight percent, with the weight average molecular weight $M_w$ of the hydroxyl terminated poly(oxetane) based fluorinated polyethers, as determined by GPC analysis, being, for example, from about 300 to about 10,000, from about 500 to about 8,000, from about 1,000 to about 6,000, from about 2,500 to about 5,500, and from about 1,500 to about 1,900. The hydroxyl number of the hydroxyl terminated poly(oxetane) based fluorinated polyethers as determined by known methods, such as gravimetric analysis, are, for example, from about 20 to about 200 milligrams KOH/gram, from about 50 to about 125 milligrams KOH/gram, from about 75 to about 100 milligrams KOH/gram, and from about 65 to about 70 milligrams KOH/gram.

Specific examples of the environmentally acceptable hydroxyl terminated poly(oxetane) based fluorinated polyethers selected for the charging roll of the present disclosure, and obtainable from OMNOVA Solutions Incorporated, are POLYFOX™ PF-7002, with a weight average molecular weight of about 1,670±200, a fluoride (F) content of about 46 percent, and a hydroxyl number of about 67.2±8 milligrams KOH/g; POLYFOX™ PF-636, having a weight average molecular weight of about 1,150, a fluoride (F) content of about 27.6 percent, and a hydroxyl number of about 99.5 milligrams KOH/gram; POLYFOX™ PF-6320, (x+y is equal to, or is about 20) having a weight average molecular weight of about 3,480, a fluoride content (F) of about 29.9 percent, and a hydroxyl number of about 32.2 milligrams KOH/gram; POLYFOX™ PF-656, (x+y is equal to, or is about 6) with a weight average molecular weight of about 1,490, a fluoride content (F) of about 34.7 percent, and a hydroxyl number of about 75.2 milligrams KOH/gram; POLYFOX™ PF-6520, (x+y is equal to, or is about 20) having a weight average molecular weight of about 4,480, a fluoride content (F) of about 39.3 percent, and a hydroxyl number of about 25 milligrams KOH/gram; POLYFOX™ PF-151N, having a weight average molecular weight of about 2,815, a fluorine content (F) of about 24.5 percent, and a hydroxyl number of about 39.9 milligrams KOH/gram; POLYFOX™ PF-154N, having a weight average molecular weight of about 3,464, a fluoride content (F) of about 19.5 percent, and a hydroxyl number of about 32.4 milligrams KOH/gram; and POLYFOX™ PF-159, with a weight average molecular weight of about 3,300, a fluoride content (F) of about 15.4 percent, and a hydroxyl number of about 34 milligrams KOH/gram, and mixtures thereof.

The aminoplast resin can include a melamine formaldehyde resin, a urea formaldehyde resin, a benzoguanamine formaldehyde resin, or a glycoluril formaldehyde resin. The aminoplast resin acts as a cross-linker with the poly(oxetane) based fluorinated polyether to form the outer surface.

In embodiments, the melamine formaldehyde resins and the benzoguanamine formaldehyde resins include methylol-type resins in which methylol groups are present as they are, full ether-type resins in which all the methylol groups are alkyl-etherified, full imino-type resins, and methylol-imino mixture-type resins may be used. Of these resins, ether-type resins are preferred over the others in point of stability in coating solutions. In embodiments, the aminoplast resin is represented by:

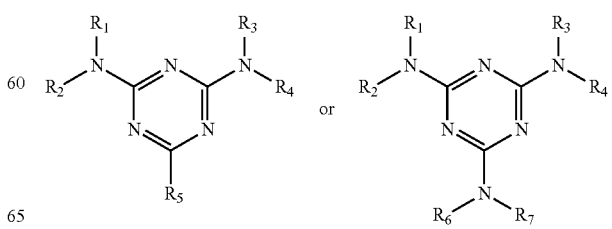

and mixtures thereof, wherein, each of $R_1$ to $R_7$ represents H, $CH_2OH$ or an alkyl ether group.

The compounds represented by formulas above may be synthesized from, e.g., melamine or guanamine and formaldehyde in accordance with any of the heretofore known methods.

The melamine resins and the benzoguanamine resins are commercially available products, such as SUPER BECKAMINE® L-148-55, SUPER BECKAMINE® 13-535, SUPER BECKAMINE® L-145-60 and SUPER BECKAMINE® TD-126 (products of DIC Corporation), NIKALAC BL-60 and NIKALAC BX-4000 (products of Sanwa Chemical Co., Ltd.), which are all benzoguanamine resins, SUPER MELAMI No. 90 (a product of NOF CORPORATION), SUPER BECKAMINE® TD-139-60 (a product of DIC Corporation), U-VAN 2020 (Mitsui Chemicals, Inc.), SUMITEX RESIN M-3 (a product of Sumitomo Chemical Co., Ltd.) and NIKALAC MW-30 and NIKALAC MW-30M (products of Sanwa Chemical Co., Ltd.), may be used as they are. Examples of melamine formaldehyde co-resin include CYMEL® 373 and other melamine formaldehyde resins, obtained from Allnex.

The hydroxyl terminated poly(oxetane) based fluorinated polyether is present in the overcoat layer 7 in an amount of from about 1 to about 75 weight percent, or from about 5 to about 70 weight percent, or from about 10 to about 50 weight percent; and the aminoplast resin is present in the overcoat layer 7 in an amount of from about 25 to about 99 weight percent, or from about 30 to about 95 weight percent, or from about 50 to about 90 weight percent.

Optional wetting agent examples, which can contribute to the smoothness characteristics, such as enabling smooth coating surfaces with minimal or no blemishes or protrusions, of the members illustrated herein include polysiloxane polymers, known suitable fluoropolymers, and mixtures thereof. The optional polysiloxane polymers include, for example, a polyester modified polydimethylsiloxane with the trade name of BYK® 310 (about 25 weight percent in xylene) and BYK® 370 (about 25 weight percent in xylene/alkylbenzenes/cyclohexanone/monophenylglycol=75/11/7/7); a polyether modified polydimethylsiloxane with the trade name of BYK® 333, BYK® 330 (about 51 weight percent in methoxypropylacetate) and BYK® 344 (about 52.3 weight percent in xylene/isobutanol=80/20), BYK®-SILCLEAN 3710 and 3720 (about 25 weight percent in methoxypropanol); a polyacrylate modified polydimethylsiloxane with the trade name of BYK®-SILCLEAN 3700 (about 25 weight percent in methoxypropylacetate); or a polyester polyether modified polydimethylsiloxane with the trade name of BYK® 375 (about 25 weight percent in dipropylene glycol monomethyl ether), all commercially available from BYK Chemical. The wetting agents for the outer surface layer are selected in various effective amounts, such as for example, from about 0.01 to about 5 weight percent, from about 0.1 to about 3 weight percent, and from about 0.2 to about 1 weight percent based on the solids present.

In embodiments, the conductive component can include carbon black, a metal oxide, or a conductive polymer. Examples of the conductive component include fine powder of: carbon black such as Ketjen Black and acetylene black; pyrolytic carbon, graphite; various kinds of electro-conductive metal or metal alloy such as aluminum, copper, nickel and stainless steel; various kinds of electro-conductive metal oxide such as tin oxide, indium oxide, titanium oxide, tin oxide-antimony oxide solid solution, and tin oxide-indium oxide solid solution; insulating materials having a surface treated by an electro-conductive process; and the like. Furthermore, examples of conductive polymers include polythiophene, polyaniline, polypyrrole, polyacetylene and the like. These electro-conductive agents may be used alone, or in combination of two or more kinds thereof. The amount of conductive component in the outer surface layer is from 0.1 to about 60 weight percent based on the weight of total solids in the outer surface layer. In embodiments, the conductive component is present in the outer surface in an amount of from about 5 to about 40 weight percent. The carbon black conductive components that can be incorporated into the outermost layer include MONARCH® 1000, EMPEROR® E1800, both obtained from Cabot Corp.

Carbon black conductive components that can be incorporated into the disclosed crosslinked outermost layer include MONARCH® 1000, EMPEROR® E1200, both obtained from Cabot Corp. The coating solvents are common alcohols including isopropanol, Dowanol, 1-butanol, cyclopentanol, etc. The disclosed acid catalysts that can be used include p-toluenesulfonic acid, oxalic acid, etc.

In embodiments the surface roughness control agent includes polyamide particles. The polyamide particles have an average diameter of from 2 microns to 20 microns. The polyamide suitable as a surface roughness control agent include ORGASOL® 2001UDNAT1 (average diameter of about 5 microns), 2001EXDNAT1 (average diameter of about 10 microns), or 2002DNAT1 (average diameter of about 20 microns), all obtained from Arkema. The roughness control agent is present in the outer layer in an amount of from about 5 to about 30 weight percent.

Examples of an acid catalyst suitable for the outer layer include aliphatic carboxylic acids, such as acetic acid, chloroacetic acid, trichloroacetic acid, trifluoroacetic acid, oxalic acid, maleic acid, malonic acid, lactic acid and citric acid; aromatic carboxylic acids, such as benzoic acid, phthalic acid, terephthalic acid and trimellitic acid; aliphatic and aromatic sulfonic acids, such as methanesulfonic acid, dodecylsulfonic acid, benzenesulfonic acid, dodecylbenzenesulfonic acid, naphthalenesulfonic acid, p-toluenesulfonic acid, dinonylnaphthalenesulfonic acid (DNNSA), dinonylnaphthalenedisulfonic acid (DNNDSA) and phenolsulfonic acid; and phosphoric acid. The acid catalyst is present in the outer layer in an amount of from about 0.1 to about 5 weight percent.

The bulk and surface conductivity of the outer surface layer 7 should be higher than that of the BCR 2 to prevent electrical drain on the BCR 2, but only slightly more conductive. Surface layers 7 with from about $1\times10^8$ ohm/□ to about $1\times10^{12}$ ohm/□, of from about $1\times10^4$ ohm/□ to about $1\times10^8$ ohm/□, or from about $1\times10^5$ ohm/□ to about $1\times10^6$ ohm/□ surface resistivity were found to be suitable.

The surface roughness ($R_z$) of the outer surface layer is in a range of about 2 microns to about 20 microns, or in embodiments in a range of about 4 microns to about 18 microns or in a range of about 8 microns to about 15 microns. By controlling the surface roughness $R_z$ of the outer surface layer to the 2 micron to 20 micron range, the durability of the electrostatic charging member is improved, and outstanding long-term retention of electrostatic charging capability is achieved.

To manufacture the outer surface layer, a mixture of a poly(oxetane) based fluorinated polyether diol, an aminoplast resin a catalyst is mixed in a solvent, such as isopropanal alcohol, to obtain a polymeric base solution. The conductive component and surface roughness control agent are added to the polymeric base solution and mixed in to form a homogenous dispersion. The dispersion is filtered and then dispersion is then coated on the BCR 2. The coating is cured at a temperature of about 25 to about 200° C., or from about 100 to about 180° C., for about 10 to about 120 minutes, or from about 25 to 65 minutes. Typical coating techniques include dip coating, roll coating, spray coating, rotary atomizers, ring coating, die casting, flow coating and the like.

Examples

Experimentally, the outer surface layer dispersion was prepared as following. POLYFOX™ PF-7002, a poly(oxetane) based fluorinated polyether diol from OMNOVA Solutions), CYMEL® 303 (a melamine formaldehyde resin from Allnex), and p-toluenesulfonic acid at the weight ratio of about 30/70/0.2 in isopropanol (about 10 weight percent solids) were combined and agitated to obtain a clear polymeric base solution. 20 weight percent of EMPEROR® E1200 (a carbon black available from CABOT) and 30 weight percent of ORGASOL® 2001UDNAT1 (a polyamide filler with an average diameter of 5 microns from Arkema) were added to the above polymeric base solution, and ball milled with 2 mm stainless steel shots for 20 hours using a paint shaker. The resulting dispersion was filtered (POLYFOX™ PF-7002/CYMEL® 303/EMPEROR® E1200/ORGASOL® 2001UDNAT1/p-toluenesulfonic acid=20.0/46.6/13.3/20.0/0.1 in isopropanol, about 15 weight percent solids) through a paint filter to obtain the final outermost layer coating dispersion. The filtered dispersion was coated onto an Olympia BCR (from FX) using a Tsukiage coater and subsequently cured at 180° C. for 30 minutes to obtain a 10-micron thick outermost layer.

The surface resistivity of the outermost layer was measured at about $1.6 \times 10^7$ ohm/square using a High Resistivity Meter (Hiresta-Up MCP-HT450 from Mitsubishi Chemical Corp.). In addition, the hexadecane contact angle, measured via Contact Angle System OCA (Dataphysics Instruments GmbH, model OCA15), of the outer layer was about 65° (noting the pure PFTE film having a hexadecane contact angle of about 45°). The outer surface layer disclosed herein greatly reduces BCR contamination. The resulting BCR with the outer surface layer disclosed herein was continuously print tested in a Xerox C75 printer in B zone up to 300 k and demonstrated improved performance.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A bias charging member comprising:
   a) a conductive core, and
   b) an outer surface layer disposed on the conductive core, the outer surface layer comprising a hydroxyl terminated poly(oxetane) based fluorinated polyether and an aminoplast resin, wherein the hydroxyl terminated poly (oxetane) based fluorinated polyether is represented by:

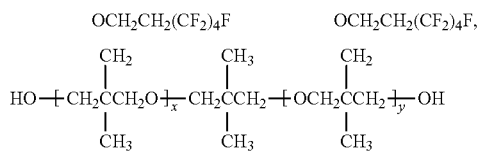

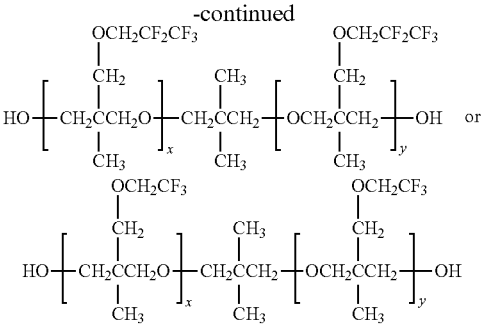

wherein x is from about 1 to about 40, y is from about 1 to about 40, and a sum of x and y is from about 2 to about 80.

2. The bias charging member in accordance with claim 1, wherein the hydroxyl terminated poly(oxetane) based fluorinated polyether comprises from about 1 weight percent to about 75 weight percent of the outer surface layer.

3. The bias charging member in accordance with claim 1, wherein the aminoplast resin comprises from about 25 weight percent to about 99 weight percent of the outer surface layer.

4. The bias charging member in accordance with claim 1, wherein the outer surface layer further comprises a surface roughness control agent.

5. The bias charging member in accordance with claim 1, wherein the outer surface layer further comprises a catalyst.

6. The bias charging member in accordance with claim 5, wherein the catalyst is an acid selected from the group consisting of: aliphatic carboxylic acids, aromatic carboxylic acids and aromatic sulfonic acids.

7. The bias charging member in accordance with claim 1, wherein the outer surface layer further comprises a conductive component.

8. The bias charging member in accordance with claim 7, wherein the conductive component is selected from the group consisting of: carbon black, metal oxides, and conductive polymers.

9. The bias charging member in accordance with claim 8, wherein the conductive component comprises from about 0.1 to about 60 percent by weight based on the weight of total solids of the outer surface layer.

10. The bias charging member in accordance with claim 1, wherein the aminoplast resin comprises a melamine formaldehyde resin.

11. The bias charging member in accordance with claim 1, further comprising a base material disposed between the conductive core and the outer surface layer.

12. The bias charging member in accordance with claim 11, wherein the base material is selected from the group consisting of: isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber, acrylonitrile-butadiene copolymer rubber (NBR) and natural rubber.

13. The bias charging member in accordance with claim 1, wherein the aminoplast resin is one of a melamine formaldehyde resin, a urea formaldehyde resin, a benzoguanamine formaldehyde resin, or a glycoluril formaldehyde resin.

14. A bias charging member comprising:
   a) a conductive core, b) a base material disposed on the conductive core; and
c) an outer surface layer disposed on the base material, the outer surface layer comprising a crosslinked hydroxyl terminated poly(oxetane) based fluorinated polyether and an aminoplast resin, wherein the crosslinked hydroxyl terminated poly(oxetane) based fluorinated polyether is represented by:

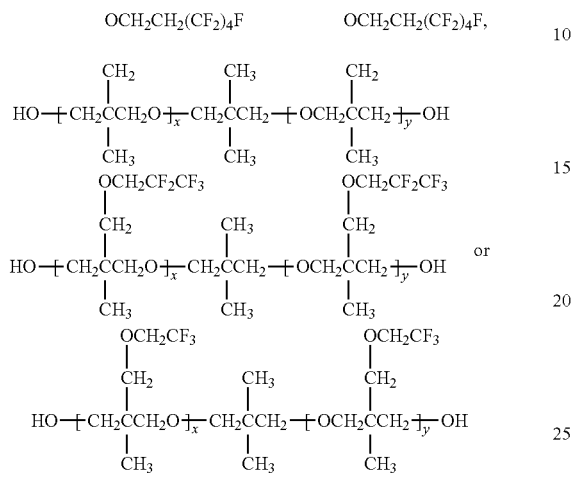

wherein x is from about 1 to about 40, y is from about 1 to about 40, and a sum of x and y is from about 2 to about 80.

15. The bias charging member of claim 14, wherein the base material is selected from the group consisting of: isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber, acrylonitrile-butadiene copolymer rubber (NBR) and natural rubber.

16. A bias charging member comprising:
a) a conductive core,
b) a base material disposed on the conductive core; and
c) an outer surface layer disposed on the base material, the outer surface layer comprising a hydroxyl terminated poly(oxetane) based fluorinated polyether and an aminoplast resin, wherein the hydroxyl terminated poly(oxetane) based fluorinated polyether comprises from about 1 weight percent to about 75 weight percent of the outer surface layer the aminoplast resin comprises from about 25 weight percent to about 99 weight percent of the outer surface layer, wherein the hydroxyl terminated poly(oxetane) based fluorinated polyether is represented by:

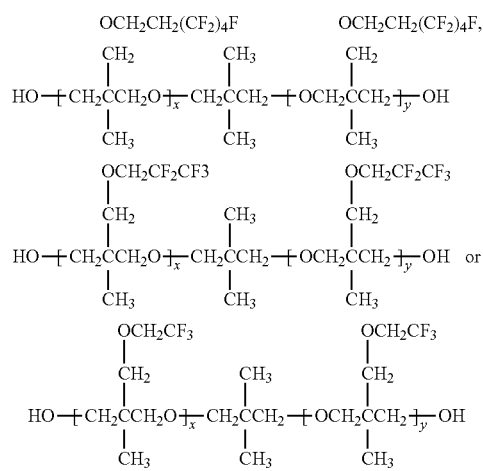

wherein x is from about 1 to about 40, y is from about 1 to about 40, and a sum of x and y is from about 2 to about 80.

17. The bias charging member in accordance with claim 16, wherein the aminoplast resin is one of a melamine formaldehyde resin, a urea formaldehyde resin, a benzoguanamine formaldehyde resin, or a glycoluril formaldehyde resin.

18. The bias charging member in accordance with claim 16, wherein the outer surface layer further comprises a conductive component, a wetting agent, a catalyst and a surface roughness control agent.

* * * * *